Patented Nov. 29, 1932

1,889,645

UNITED STATES PATENT OFFICE

OTTO EISLEB, OF HOFHEIM-ON-TAUNUS, GERMANY, ASSIGNOR TO WINTHROP CHEMICAL COMPANY, INC., OF NEW YORK, N. Y., A CORPORATION OF NEW YORK

BETA-DIMETHYLAMINOETHYL ESTER OF PARA-BUTYLAMINO-BENZOIC ACID

No Drawing. Application filed June 22, 1932, Serial No. 618,311, and in Switzerland December 22, 1930.

My present invention relates to the beta-dimethylaminoethyl ester of para-butylaminobenzoic acid, which compound has the following probable constitution:

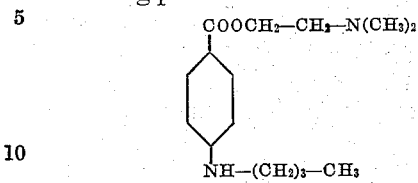

In U. S. Patent No. 1,550,350 of August 18, 1925, are described alkamine esters of N-monoalkylated and N-monoalkoxy-alkylated derivatives of para-aminobenzoic acid, which are obtained by esterifying, by one of the usual methods, para-N-monoalkyl- or para-N-monoalkyloxyalkylaminobenzoic acids, other than para-N-monomethyl- and para-N-monoethylaminobenzoic acid by means of amino alcohols or by treating alkamine esters of para-aminobenzoic acid with such alkylating or alkoxyalkylating agents as contain alkyl residues or alkoxyalkyl residues having more than 2 carbon atoms.

Now I have found that the hitherto unknown beta-dimethylaminoethyl ester of para-butylaminobenzoic acid, which is by far superior to the analogous products hitherto known and especially to those described in the said U. S. patent, is obtained by esterifying para-butylaminobenzoic acid with beta-dimethylaminoethanol according to one of the usual methods, or by treating with a butylating agent the beta-dimethylaminoethyl ester of para-aminobenzoic acid.

The new product itself and its water-soluble salts, for instance, the monohydrochloride, have a very strong anaesthetising action without causing any irritation and have a very favorable thereapeutic index. The therapeutic index, i. e. the relation between the efficacy and the toxicity of a therapeutic shows the value of a therapeutic substance. The therapeutic index of the new product is remarkably greater (up to two and four times greater) than that of the known analogous products, as for instance described in U. S. Patent No. 1,550,350. The new product, which has a good stability, also in aqueous solutions is, therefore, of a greater usefulness for anaesthetic purposes, especially for anaesthesia of the mucous membranes and for nerve anaesthesia (conductive anaethesia) than the known products. The new product is also suitable for lumbar anaesthesia and sacral anaesthesia.

The following examples illustrate the invention. (1) 4-butylaminobenzoic acid is produced by boiling an aqueous solution of the sodium salt of 4-aminobenzoic acid with N-butyl-bromide. It forms a colorless crystalline powder melting at 153° C.–154° C.

Equimolecular quantities of 4-butylaminobenzoic acid and the hydrochloride of beta-dimethylaminoethanol are suspended in 10 times their joint weight of toluene; the mixture is saturated with hydrochloric acid gas and heated in an oil bath at about 150° C. while a current of hydrochloric acid gas is slowly passed through the mixture so that toluene slowly distils. Along with toluene the water produced by the esterification distils. After heating for about 10 hours the mixture is cooled and water is added until the salt is dissolved; the layer of toluene is separated and the ester base precipitated from the aqueous solution by means of a solution of sodium carbonate. By dissolving the base in ether, drying the ether solution separated over potassium carbonate and adding alcoholic hydrochloric acid to the solution until it is neutral to litmus, the monohydrochloride is obtained in the form of a colorless crystalline powder which, when recrystallized from alcohol, melts at 147° C.–148° C.

The 4-butylaminobenzoic acid-beta-dimethylaminoethylester - monohydrochloride is a colorless crystalline powder, which is easily soluble in water. The solution may be sterilized by boiling without a decomposition having to be feared. The base can be precipitated from the aqueous solution of the salt; it is at first in the form of an oil but soon solidifies, forms colorless crystals and melts at 43° C. The picrate melts at 120° C. When treated with oxalic acid, the base forms a neutral oxalate which is easily soluble in water and an acid oxalate which is very difficultly soluble in cold water. The mononitrate forms lamellæ and melts at 131° C.–132° C.

(2) 4-butylaminobenzoic acid ethyl ester is produced by boiling, in a reflux apparatus, 4-butylaminobenzoic acid and 4 times the quantity of alcohol containing 1⅓ mol of hydrogen chloride, partly distilling the alcohol and decomposing by means of caustic soda solution. It forms colorless crystals and melts at 69° C.–70° C.

By boiling 4-butylaminobenzoic acid ethyl ester with an excess of beta-dimethylaminoethanol, while adding a small quantity of sodium ethylate, the alykl is eliminated; ethyl alcohol distils; after the excess of dimethylaminoethanol has been distilled in a vacuum, the remaining 4-butylaminobenzoic acid-beta-dimethylaminoethylester is treated with the equimolecular quantity of hydrochloric acid, whereby the monohydrochloride is obtained which when the solution is cooled, precipitates in the form of crystals melting at 147° C.–148° C.

(3) 4-butylaminobenzoic acid-beta-chlorethyl ester is produced by saturating with hydrochloric acid gas a solution of 4-butylaminobenzoic acid in 10 times the quantity of ethylene chlorohydrin, heating the mixture on the water bath for 8 hours and distilling the excess of ethylene chlorohydrin in a vacuum. The oily crude ester is purified by dissolving in ether, washing free from acid with a solution of sodium carbonate, drying over potassium carbonate and distilling the ether. The purified ester melts at 64° C.–65° C.

4-butylaminobenzoic acid-beta-chlorethylester is dissolved, while cooling, in a benzene solution of somewhat more than the calculated quantity of dimethylamine; this solution is heated in a pressure vessel for 8 hours at 100° C. After cooling the benzene solution is several times shaken with water, whereby the dimethylamine salt is dissolved in water, but the ester base remains in the benzene layer. The ester base is eliminated from the benzene layer by shaking with dilute acetic acid; the base is precipitated from the acetic acid solution by means of caustic soda solution, dissolved in ether and dried over sodium carbonate. By precipitating the ether solution with alcoholic hydrochloric acid until it is neutral to litmus, the 4-butylaminobenzoic acid-beta-dimethylaminoethylester-monohydrochloride is obtained; it melts at 147° C.–148° C.

(4) Equimolecular quantities of 4-aminobenzoic acid-beta-dimethylaminoethylester and N-butyl bromide and butyl alcohol as diluent are refluxed for 3 hours in an oil bath. Hot water is then added and the butyl alcohol is distilled with steam. After cooling the aqueous solution is precipitated with sodium carbonate solution, the alkamine ester mixture is dissolved in ether, dried over potassium carbonate, and, after the ether has been distilled, fractionated in a vacuum. The 4-butylaminobenzoic acid-beta-dimenthylaminoethylester distils at 210° C. under 4 mm. pressure. For completely purifying, the monohydrochloride is produced in an alcoholic solution; it melts at 147° C.–148° C.

I claim:

The beta-dimethylaminoethylester of para-butylaminobenzoic acid, which compound has the following probable constitution

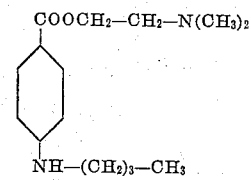

and forms colorless crystals melting at 43° C., said compound forming a monohydrochloride being a colorless crystalline powder, easily soluble in water and melting at 147° C.–148° C. and a mononitrate melting at 131° C.–132° C.

In testimony whereof, I affix my signature.

OTTO EISLEB.